Nov. 24, 1925.

J. B. ANDERSON

TREE GUARD

Filed Dec. 24, 1924

1,562,729

Inventor
James B. Anderson

By Herbert E. Smith
Attorney

Patented Nov. 24, 1925.

1,562,729

UNITED STATES PATENT OFFICE.

JAMES B. ANDERSON, OF GRANDVIEW, WASHINGTON.

TREE GUARD.

Application filed December 24, 1924. Serial No. 757,890.

*To all whom it may concern:*

Be it known that I, JAMES B. ANDERSON, a citizen of the United States, residing at Grandview, in Yakima County and State of Washington, have invented certain new and useful Improvements in Tree Guards, of which the following is a specification.

My present invention relates to improvements in tree guards of the type embodying a folded encircling band for attachment to a tree to form a trough for the reception and retention of a liquid that will prevent insects and other pests from travelling up or down on the tree surface. The primary object of the invention is the provision of a guard of this character, preferably of elastic material as rubber, which may be manufactured with facility and at a comparatively inexpensive cost of production, which may be applied to and detached from a tree with convenience, and which will be efficient in the performance of its required functions.

The invention consists in certain novel combinations and arrangements of parts involving the structure of the guard together with means for supporting the guard and securing its ends together to form a liquid tight joint, and means for disposing of rain water or other water or excess liquid from the trough, as will hereinafter be more fully set forth and claimed.

In the accompanying drawings I have illustrated one complete example of the physical embodiment of my invention wherein the parts are combined and arranged in accordance with the best mode I have thus far devised for the practical application of the principles of my invention.

Figure 1:
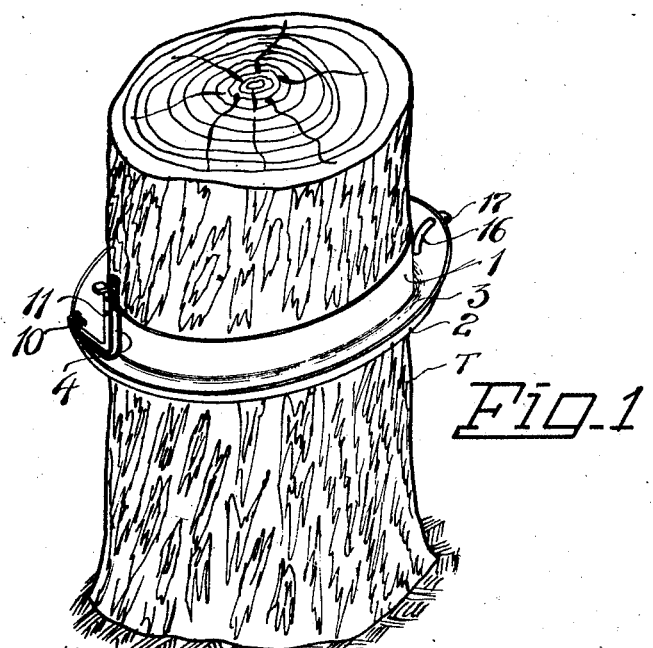
Figure 1 is a perspective view showing the device of my invention applied to a tree trunk.

To illustrate the relation of parts I have indicated a tree trunk as T in the drawings, about which the guard or circular trough is supported, to contain a liquid as oil or petroleum. The guard is designed to fit around the tree and so closely against its periphery as to prevent passage of insects, worms, or other pests between the trough and tree, and of course the petroleum or other liquid in the trough will prevent, by annihilation, passage around the trough of the pests. Thus the pests from above the trough are prevented from coming to the ground for propagation, and pests from the ground are prevented from ascending the tree.

The guard in the form of a trough may be made up of rubber, fabric, metal, or pressed pulp, and in each instance is made up or fashioned into a folded band with overlapping ends. Thus the inner circular wall 1 of the trough is adapted to cling closely to the periphery of the tree, and if necessary any irregularities between the surface of the tree and this wall may be sealed with plastic material, as putty. The outer wall 2 of the trough is inclined as shown to form a V-shaped trough 3 in which oil or other liquid is contained, or the trough may be of other shape in cross section if desired. The trough is made up of a single piece of material with ends 4 and 5 in order that it may be with facility placed around the tree, and when in proper position these ends overlap to form a closed joint. If required the joint may be sealed with a suitable cement, but if the material of which the trough is fashioned is elastic, this joint is closed in a liquid tight manner by the combined support and clamp for the trough.

In addition to the friction of the elastic material for retaining the trough in place on the tree I use a device which includes a vertical arm 6 having a nail hole 7 for a nail N which is driven into the tree above the trough for supporting the latter. Near its upper end and on its outer face this arm is fashioned with spaced teeth 8, and the integral, diverging arm 9 is fashioned at its upper end with a perforated, angular flange 10.

Figure 2:
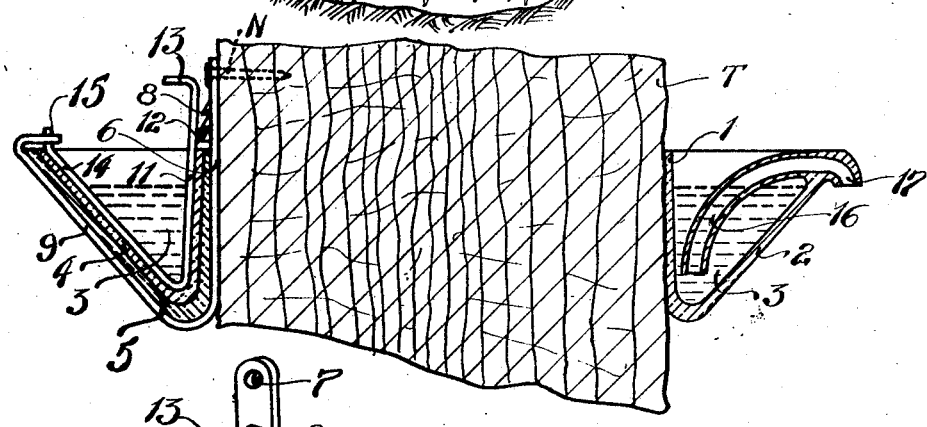
Figure 2 is a transverse sectional view, enlarged, showing the guard.
Figure 3:
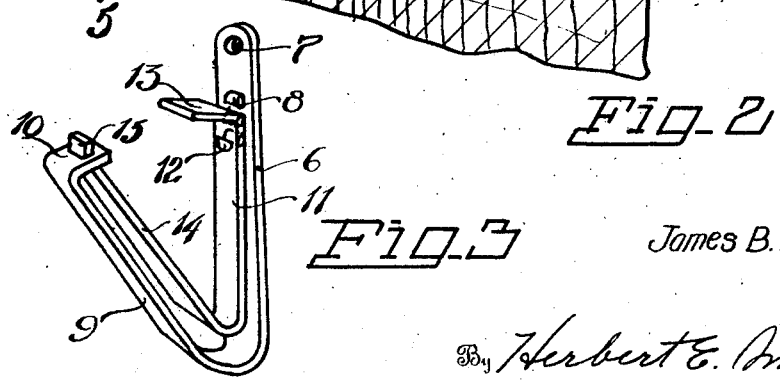
Figure 3 is a detail perspective view of the combined supporting device and clamping device for holding the adjoining or overlapping ends of the trough.

This supporting bracket which includes the two arms 6 and 9 is of V shape to conform to the cross sectional shape of the trough, and this outer bracket member engages the outer faces of the trough as seen in Figure 2 to support the latter.

In combination with the supporting bracket I utilize a clamping member located within the trough and designed to clamp the overlapping ends 4 and 5 of the trough to form a sealed joint. This inner clamping member is also of V-shape and comprises an inner arm 11 with a single tooth 12 designed to selectively engage the teeth 8 of the bracket. An upper bent end 13 of this arm 11 may be utilized as a handle for manipulating the V-shaped clamping arms the other arm of which is indicated by the numeral 14. This arm 14 is provided with an end pin 15 which is passed upwardly from below through the perforated flange 10 of the bracket arm 9, to anchor and retain the clamping bracket within the supporting bracket. Thus the supporting bracket engages one of the overlapping ends on the outer side of the trough and the clamping bracket engages the other overlapping end on the inner side of the trough. By pushing down on the handle 13 the overlapping ends of the trough are compressed and frictionally retained between the clamping bracket and the supporting bracket, and the tooth 12 of the clamping bracket is snapped under one of the teeth 8 of the supporting bracket to hold the clamping device in clamped position.

In this manner the trough may be secured in operative position, and readily removed when required for emptying or cleansing, and with equal facility may be replaced in operative position.

The overlapping ends of the trough permit the adaptation to trees of varying circumferences of the same size trough; for a tree of minimum circumference a greater length of the ends will overlap than when the trough is placed about a tree of maximum circumference, but in each and all instances the clamp device will be effective for performing its functions.

To provide for automatic elimination of excess moisture, as rain water, from the oil in the trough, I provide a siphon tube or pipe 16 having its lower end near the bottom of the trough. This tube or pipe has an outlet nozzle 17 through the wall of the trough by means of which the water from beneath the oil in the trough may be siphoned out when the level of the oil reaches the proper height.

Instead of filling the trough solely with oil, water may first be poured into the trough and then the required quantity of oil may be poured on top of the water to form a film for the pests, and any excess of water may be disposed of as indicated above. The split, folded, band or trough if necessary may be sealed at its overlapping ends in such manner as to permit expansion of the trough as the tree grows, and the troughs may either be permanent fixtures on the tree or they may be removed and replaced at proper seasons.

Having thus fully described my invention, what I claim as new and desire to secure by Letters Patent is—

1. A tree guard comprising an encircling trough adapted to contain a liquid and means for automatically siphoning excess liquid from said trough.

2. A tree guard comprising an encircling trough and means for supporting the trough, and a siphon tube integral with the trough having an inlet end terminating near the bottom of the trough and its outlet end exterior of the trough for disposing of excess liquid.

In testimony whereof I affix my signature.

JAMES B. ANDERSON.